(12) United States Patent
Niwamae et al.

(10) Patent No.: US 10,928,703 B2
(45) Date of Patent: Feb. 23, 2021

(54) IMAGE PICKUP APPARATUS

(71) Applicant: CANON KABUSHIKI KAISHA, Tokyo (JP)

(72) Inventors: Yuki Niwamae, Yokohama (JP); Kazuya Karibe, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/816,590

(22) Filed: Mar. 12, 2020

(65) Prior Publication Data

US 2020/0326608 A1 Oct. 15, 2020

(30) Foreign Application Priority Data

Apr. 10, 2019 (JP) ................................. 2019-074589
Apr. 10, 2019 (JP) ................................. 2019-074590

(51) Int. Cl.
*G03B 9/14* (2006.01)
*G03B 9/26* (2006.01)
*G03B 17/02* (2021.01)

(52) U.S. Cl.
CPC ................. *G03B 9/14* (2013.01); *G03B 9/26* (2013.01); *G03B 17/02* (2013.01)

(58) Field of Classification Search
CPC ... G03B 9/14; G03B 9/26; G03B 9/36; G03B 9/60
See application file for complete search history.

(56) References Cited

U.S. PATENT DOCUMENTS

| 10,386,699 B2 | 8/2019 | Takayama et al. |
| 10,503,052 B2 | 12/2019 | Karibe et al. |
| 2018/0224713 A1* | 8/2018 | Ishibiki .................... G03B 9/22 |

FOREIGN PATENT DOCUMENTS

| JP | 2011053375 A | 3/2011 |
| JP | 5414463 B2 | 2/2014 |

* cited by examiner

*Primary Examiner* — Minh Q Phan
(74) *Attorney, Agent, or Firm* — Carter, Deluca & Farrell LLP

(57) ABSTRACT

An image pickup apparatus configured to capture an image in accordance with a capturing instruction from a user includes a cam member having a first phase configured to hold the second drive member while the second biasing member is charged, and a second phase configured to enable the second drive member to be driven, a driver configured to drive the cam member, and a controller configured to drive the driver in a first direction after first imaging, until the cam member passes through the first phase and reaches the second phase, and to drive the driver in a second direction opposite to the first direction when an imaging instruction is released from the first imaging to second imaging next to the first imaging, until the cam member reaches the first phase from the second phase.

9 Claims, 19 Drawing Sheets

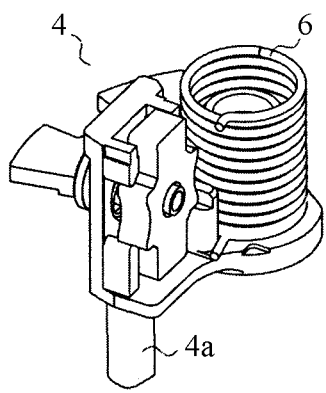
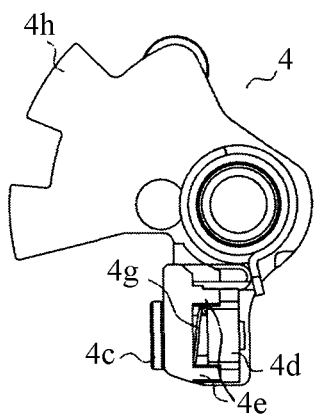
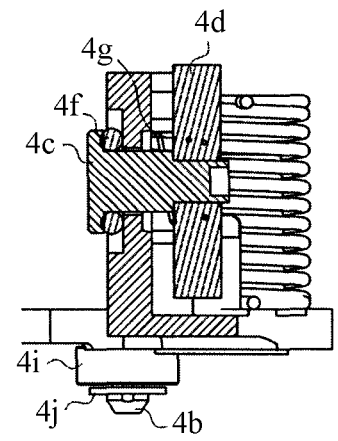
FIG. 3A   FIG. 3B   FIG. 3C
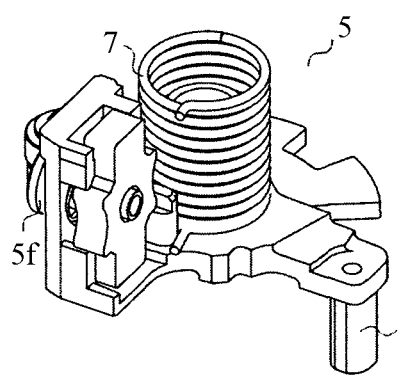
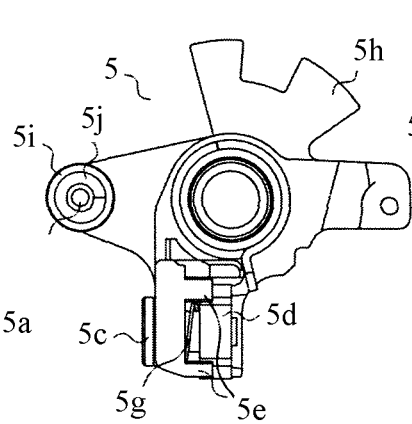
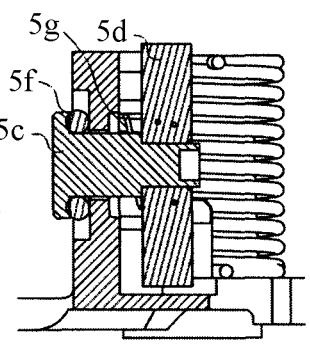
FIG. 3D   FIG. 3E   FIG. 3F

IMAGE PICKUP APPARATUS

BACKGROUND OF THE INVENTION

Field of the Invention

The present invention relates to an image pickup apparatus having a focal plane shutter.

Description of the Related Art

In one conventional focal plane shutter for a camera, a slit formed by two blade units attached to a shutter base plate continuously exposes an imaging plane. A shutter base plate includes two driving members, each driven by a biasing member, and configured to operate each blade unit. The shutter base plate further includes a motor that drives a cam gear that charges the driving member to a standby position against the biasing force of the biasing member. In the motor, an angle of over-rotation (referred to as an "overrun" hereinafter) from when the power is turned off to when the motor stops varies depending on the applied voltage and the use environment. Thus, a sufficient motor idling section is provided at the cam top of the cam gear so as to secure the overcharge state even when the motor overruns the longest distance.

Japanese Patent Laid-Open No. ("JP") 2011-53375 discloses an image pickup apparatus that drives up to a running preparation state without stopping the charging unit in the overcharge state when the switch for instructing the start of the imaging operation is turned on after the charging of the biasing member by the charging unit is completed.

When the switch is turned off, the image pickup apparatus disclosed in JP 2011-53375 needs a long motor idling section for the overrun in order to stop the charging unit in the overcharge state. Thus, when continuous imaging is instructed, it takes a long time for the cam gear to pass the cam top section and it takes a long time to transfer to the next imaging. It is thus difficult to increase a frame rate of the camera. There are several ways to increase the frame rate, such as increasing the motor characteristic, changing the material of the blade to a lighter material and lowering the biasing force of the biasing member.

SUMMARY OF THE INVENTION

The present invention provides an image pickup apparatus that can economically increase a frame rate.

An image pickup apparatus according to one aspect of the present invention configured to capture an image in accordance with a capturing instruction from a user includes a base plate having an aperture through which light passes, a first drive member configured to drive a first blade unit, a second drive member configured to drive a second blade unit, a first biasing member configured to bias the first driving member such that the first blade unit moves from a closed state that closes the aperture to an opening state that opens the aperture, a second biasing member configured to bias a second drive member such that the second blade unit moves from the opening state to the closed state, a cam member having a first phase configured to hold the second drive member while the second biasing member is charged, and a second phase configured to enable the second drive member to be driven, a driver configured to drive the cam member, and a controller configured to drive the driver in a first direction after first imaging, until the cam member passes through the first phase and reaches the second phase, and to drive the driver in a second direction opposite to the first direction when an imaging instruction is released from the first imaging to second imaging next to the first imaging, until the cam member reaches the first phase from the second phase.

Further features of the present invention will become apparent from the following description of exemplary embodiments with reference to the attached drawings.

BRIEF DESCRIPTION OF THE DRAWINGS

FIGS. 3A to 3F are perspective views of a drive lever in the focal plane shutter according to the first embodiment.

DESCRIPTION OF THE EMBODIMENTS

Figure 1:
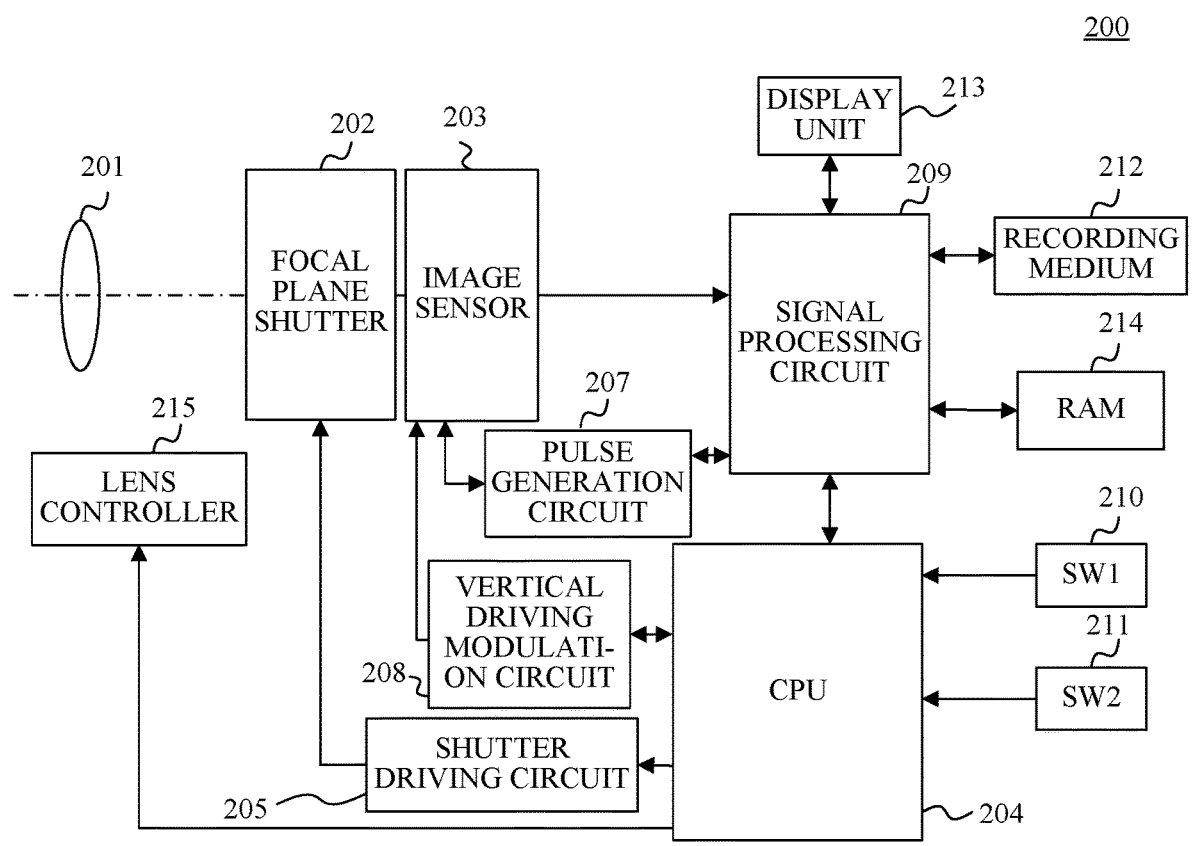
FIG. 1 is a block diagram of an image pickup apparatus according to one embodiment of the present invention.

Referring now to the accompanying drawings, a detailed description will be given of embodiments according to the present invention. Corresponding elements in respective figures will be designated by the same reference numerals, and a duplicate description thereof will be omitted.

FIG. 1 is a block diagram of an image pickup apparatus 200 according to one embodiment of the present invention. The image pickup apparatus 200 includes an image pickup apparatus main body ("main body") having an image sensor 203 and an image pickup lens (interchangeable lens, lens apparatus, image pickup optical system) 201 that is attachable to and detachable from the main body. The image pickup apparatus 200 can provide a normal exposure method using front blades and rear blades in a focal plane shutter, an electronic front curtain method using reset scanning (electronic front curtain scanning) and the rear blades. In this embodiment, the image pickup lens 201 is detachable from the main body, but may be integrated with the main body.

The object light from the image pickup lens 201 travels to the image sensor 203. The image pickup lens 201 may have a diaphragm. The image sensor 203 includes a CMOS image sensor or the like, and photoelectrically converts an object image (optical image) formed by the image pickup lens 201. A focal plane shutter (shutter apparatus) 202 is disposed on the object side of the image sensor 203 and controls an exposure amount of the image sensor 203. The CPU (controller) 204 controls and calculates a shutter driving circuit 205, a vertical driving modulation circuit (scanner) 208, a signal processing circuit 209, and a lens controller 215. The CPU 204 controls the operation of the focal plane shutter 202 (start timing of the blade unit running and driving of the motor) via the shutter driving circuit 205.

A first switch (SW1) 210 is a switch for starting the imaging preparation, and a second switch (SW2) 211 is a switch for starting the imaging. The first switch 210 and the second switch 211 are configured as two-stroke switches. The first switch 210 is turned on in the first stroke, and the second switch 211 is turned on in the second stroke.

The lens controller 215 outputs to the CPU 204 image pickup condition information (information on the state of the lens apparatus or the lens information), such as a focal length of the image pickup lens 201, an aperture diameter (F-number or aperture value), an exit pupil diameter, and a distance between the exit pupil and the image sensor 203. The lens controller 215 controls the operation (driving) of the image pickup lens 201 (including the diaphragm) in accordance with an instruction from the CPU 204.

The CPU 204 supplies a scanning clock (horizontal driving pulse) and a predetermined control pulse to the image sensor 203 via a pulse generation circuit 207. The vertical scanning clock among the scanning clocks generated by the pulse generation circuit 207 is modulated to a predetermined clock frequency by the vertical driving modulation circuit 208 and input to the image sensor 203. The vertical driving modulation circuit 208 is a scanner as an electronic front curtain, and performs reset scanning as an electronic front curtain based on a command from the CPU 204 or sets a scanning pattern of a scan for starting the charge accumulation for each pixel in the image sensor 203. The vertical driving modulation circuit 208 performs the reset scanning in order from the top to the bottom or from the bottom to the top based on the instruction from the CPU 204.

The pulse generation circuit 207 also outputs a clock signal to the signal processing circuit 209. The signal processing circuit 209 performs predetermined processing (such as color processing and gamma correction) for the signal read from the image sensor 203 to generate image data. A recording medium 212 records image data generated by the signal processing circuit 209. A display unit 213 includes a liquid crystal display (LCD) and displays images and various menu screens. A RAM (Random Access Memory) 214 is a storage unit that is connected to the signal processing circuit 209 and temporarily stores the image data and the like.

First Embodiment

Referring now to FIGS. 2A to 6, a description will be given of a structure of the focal plane shutter 202 according to this embodiment.

Figure 2A:
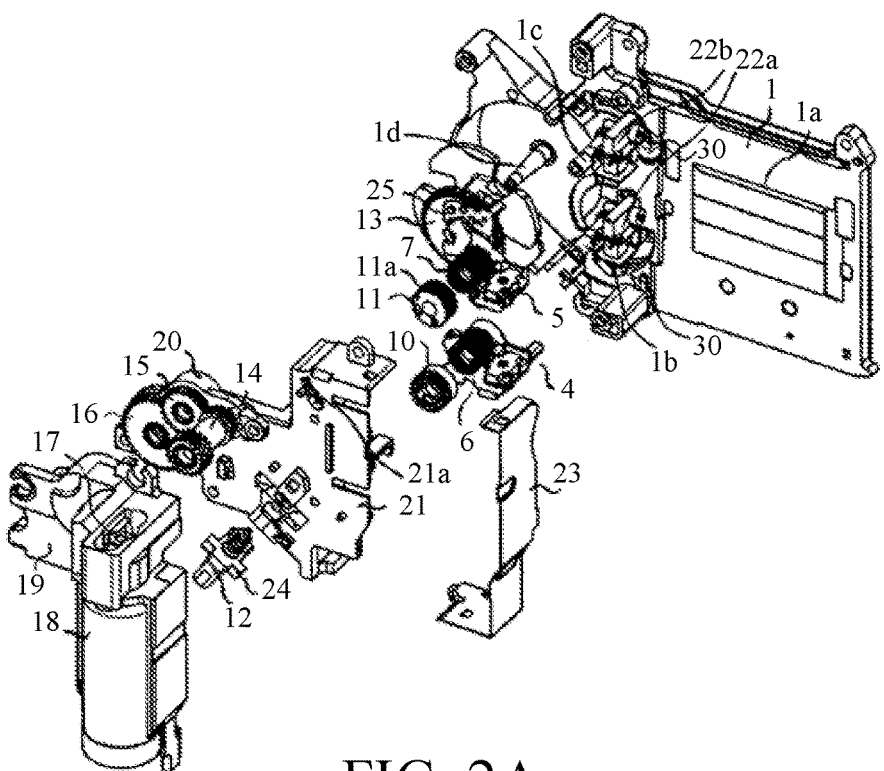
FIGS. 2A and 2B are exploded perspective views of a focal plane shutter according to the first embodiment.
Figure 2B:
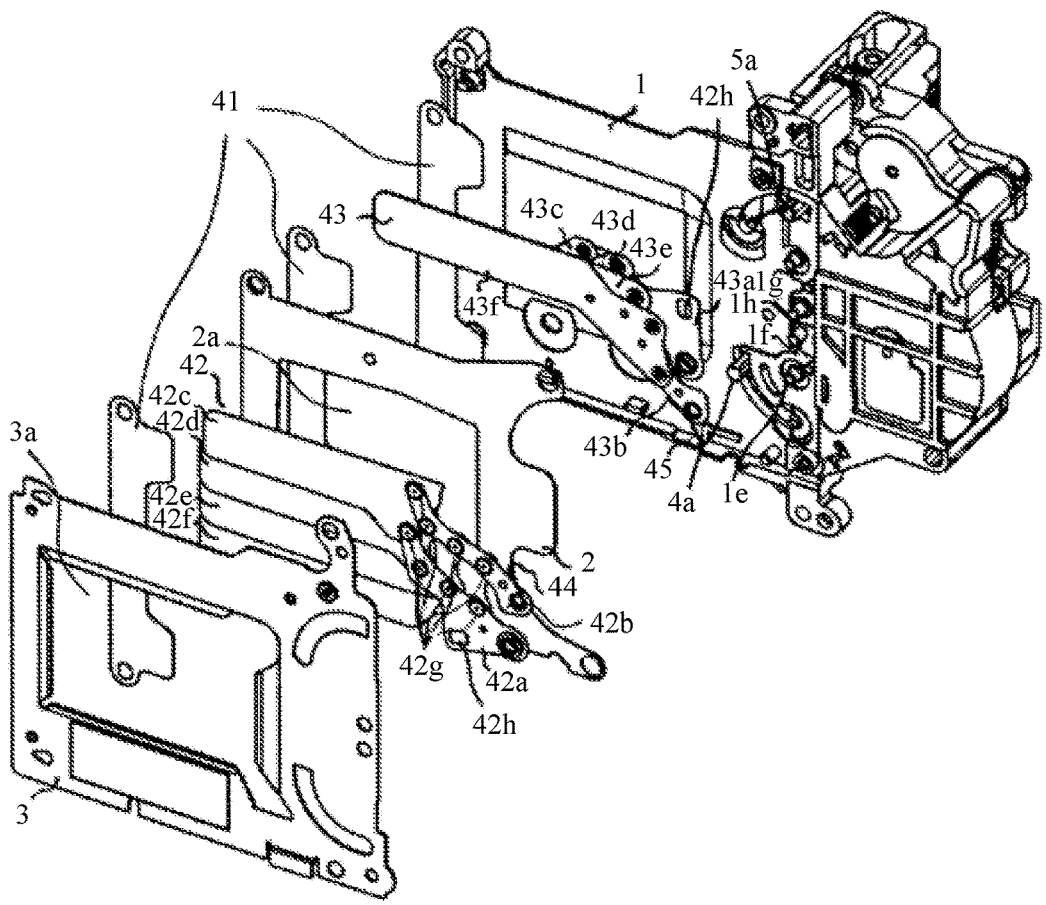

FIGS. 2A and 2B are exploded perspective views of the focal plane shutter 202. FIG. 2A is an exploded perspective view of the drive lever side when the focal plane shutter 202 is viewed from the object side, and FIG. 2B is an exploded perspective view of a blade chamber side viewed from the user side.

FIGS. 3A to 3F are perspective views of a front drive lever (first drive member) 4 and a rear drive lever (second drive member) 5. FIG. 3A is a perspective view of the front drive lever 4. FIG. 3B is a top view of the front drive lever 4. FIG. 3C is a sectional view of a portion used for attracting the front drive lever 4 to a front electromagnet 22a. FIG. 3D is a perspective view of the rear drive lever 5. FIG. 3E is a top view of the rear drive lever 5. FIG. 3F is a sectional view of a portion used for attracting the rear drive lever 5 to a rear electromagnet 22b.

Figure 4A:
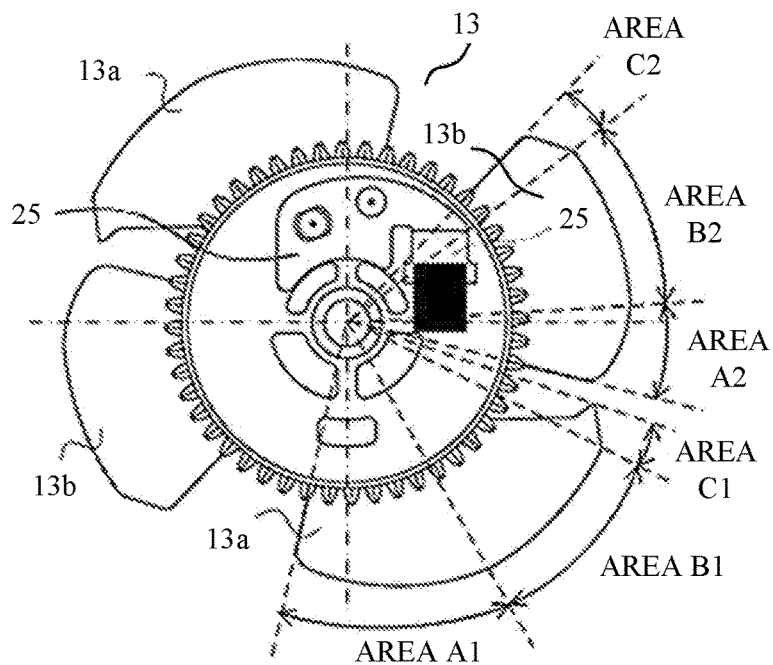
FIGS. 4A to 4C illustrate a cam gear of the focal plane shutter according to the first embodiment.
Figure 4B:
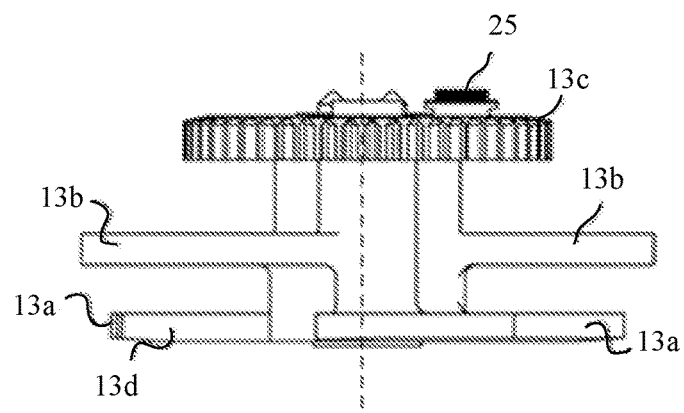
Figure 4C:
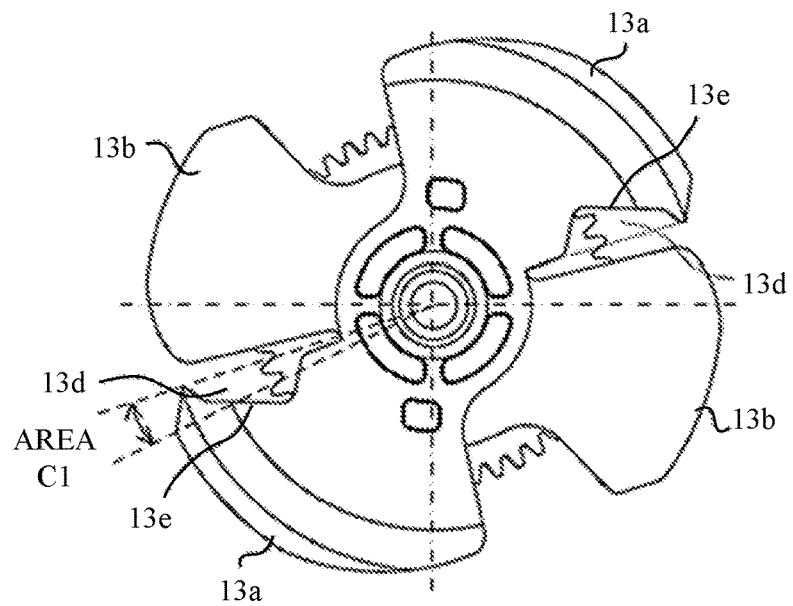

FIGS. 4A to 4C illustrate a cam gear (cam member) 13. FIG. 4A illustrates the cam gear 13 viewed from the top. FIG. 4B illustrates the cam gear 13 viewed from the side. FIG. 4C illustrates the cam gear 13 viewed from the bottom.

Figure 5A:
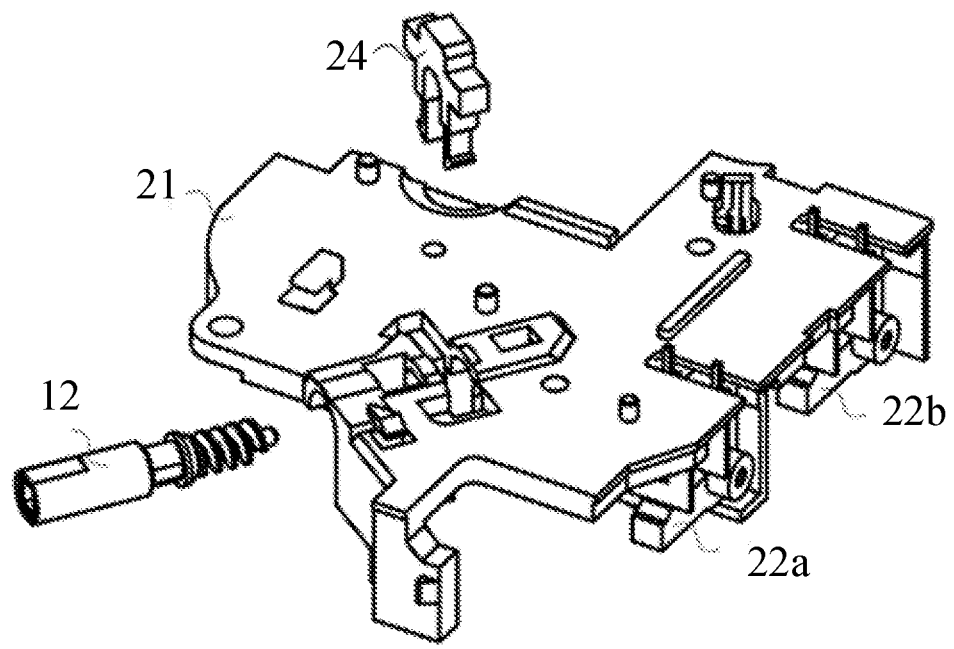
FIGS. 5A and 5B are perspective views of an upper base plate of the focal plane shutter according to the first embodiment.
Figure 5B:
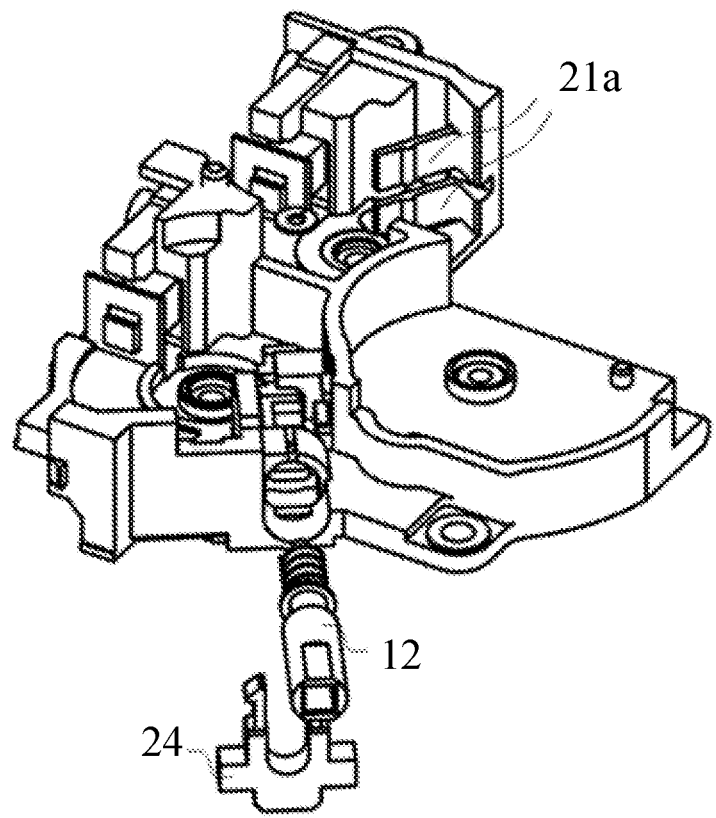

FIGS. 5A and 5B are perspective views of an upper base plate 21. FIG. 5A illustrates the upper base plate 21 viewed from the object side. FIG. 5B illustrates the upper base plate 21 viewed from the user side.

Figure 6:
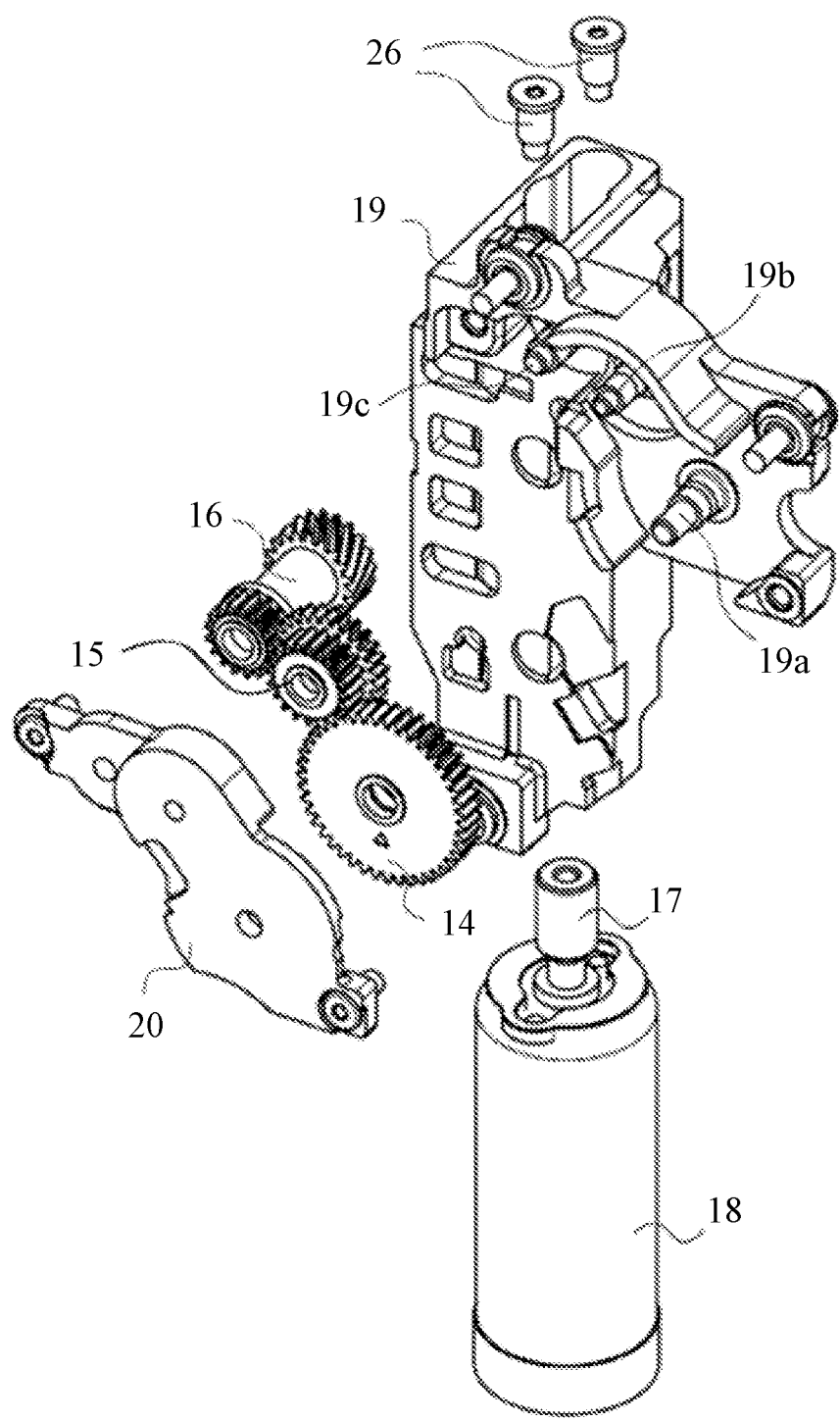
FIG. 6 is an exploded perspective view of a motor unit for the focal plane shutter according to the first embodiment.

FIG. 6 is an exploded perspective view of the motor unit.

The shutter base plate 1 is made of resin, and has an aperture 1a at the center part. The shutter base plate 1 has a front drive lever shaft 1b, a rear drive lever shaft 1c, a cam gear shaft 1d, a front main arm shaft 1e, a front sub arm shaft 1f, a rear main arm shaft 1g, and a rear sub arm shaft 1h.

A partition plate 2 and a cover plate 3 are attached to the shutter base plate 1 on the user side. Each of an aperture 2a in the partition plate 2 and an aperture 3a in the cover plate 3 has a shape similar to that of the aperture 1a in the shutter base plate 1, and a rectangular exposure aperture (shutter aperture) is formed when these three apertures overlap one another. Then, the light beam passing through the focal plane shutter 202 is restricted.

The blade chamber in which a blade unit is disposed is formed between the shutter base plate 1 and the partition plate 2 and between the partition plate 2 and the cover plate 3.

A front blade unit 42 closes the shutter aperture before exposure. The front blade unit 42 has a main arm 42a and a sub arm 42b. The main arm 42a is rotatably attached to the front main arm shaft 1e, and the sub arm 42b is rotatably attached to the front sub arm shaft 1f.

The front blade unit 42 has a first blade 42c, a second blade 42d, a third blade 42e, and a fourth blade 42f The first blade 42c has a slit. Each blade is rotatably supported by the main arm 42a and the sub arm 42b by a pin 42g to form a parallel link.

The main arm 42a has a hole 42h and is engaged with the blade operating pin 4a of the front drive lever 4. A front aligning spring 44 that biases the blades counterclockwise in FIG. 2B is engaged with the sub arm 42b so as to fold the blades.

The rear blade unit 43 closes the shutter aperture after exposure. The rear blade unit 43 has a main arm 43a and a sub arm 43b. The main arm 43a is rotatably mounted on the rear main arm shaft 1g, and the sub arm 43b is rotatably mounted on the rear sub arm shaft 1h.

The rear blade unit 43 has a first blade 43c, a second blade 43d, a third blade 43e, and a fourth blade 43f. The first blade 43c has a slit. Each blade is rotatably supported by the main arm 43a and the sub arm 43b so as to be rotatable by a pin 43g, and forms a parallel link.

The main arm 43a has a hole 43h and is engaged with the blade operating pin 5a of the rear drive lever 5. A rear aligning spring 45 that biases the blades counterclockwise is engaged with the sub arm 43b in FIG. 2B so as to unfold the blades.

A spacer 41 is attached to a tip portion of each blade of the front blade unit 42 and the rear blade unit 43 to suppress the movement of each blade in the optical axis direction.

A movable end of a first drive spring (first biasing member) 6 is engaged with the first drive lever 4, and its fixed end is engaged with an adjuster 10. The front drive spring 6 biases the front drive lever 4 so that the front blade unit 42 moves from an unfolded state (closed state) that closes the shutter aperture to a folded state (opening state, running completion state) that opens the shutter aperture. A movable end of the rear drive spring (second biasing member) 7 is engaged with the rear drive lever 5, and its fixed end is engaged with the ratchet 11. The rear drive spring 7 biases the rear drive lever 5 so that the rear blade unit 43 moves from a folded state (opening state) that opens the shutter aperture to an unfolded state (closed state, running completion state) that closes the shutter aperture.

Rotating the adjuster 10 with a worm 12 can adjust the biasing force of the front drive spring 6. By adjusting the biasing force of the front drive spring 6, the running speed of the front blade unit 42 can be set. After rotating the adjuster 10, a worm stopper 24 holds the worm 12 so as to prohibiting it from rotating.

A ratchet 11 is disposed such that its central axis is coaxial with the rear drive lever shaft 1c. The ratchet 11 is fixed by engaging a ratchet teeth 11a with a ratchet claw 21a of the upper base plate 21. The biasing force of the rear drive spring 7 can be adjusted by rotating the ratchet 11 and by changing the position of the ratchet teeth 11a. The running speed of the rear blade unit 43 can be set by adjusting the biasing force of the rear drive spring 7.

The front electromagnet 22a, the rear electromagnet 22b, and an unillustrated flexible substrate are fixed to the upper base plate 21. The terminal of each electromagnet is connected to the shutter driving circuit 205 via the unillustrated flexible substrate. The magnet cover 23 is fixed onto the upper base plate 21 so as to cover each electromagnet, and protects the attracting portion of each electromagnet and an attracting surface of an armature of each drive lever from external dust.

A motor (driver) 18 is fastened to a motor base plate 19 by screws 26. The motor base plate 19 is fastened to the shutter base plate 1 with screws. A first reduction gear 14, a second reduction gear 15, and a third reduction gear 16 are rotatably attached to shafts 19a, 19b, and 19c provided on the motor base plate 19, respectively. A pinion gear 17 is attached to the motor 18. A gear cover 20 is fastened to the motor base plate 19 with screws. The rotational force of the motor 18 is transmitted to the pinion gear 17, the first reduction gear 14, the second reduction gear 15, the third reduction gear 16, and the cam gear 13 in this order.

The front drive lever 4 includes a blade operating pin 4a, a roller shaft 4b, an armature shaft 4c, an armature 4d, an armature guide portion 4e, armature rubber 4f, an armature spring 4g, a PI light shielding portion 4h, a roller (cam follower) 4i, and a slit washer 4j. The blade operating pin 4a collides with a buffer member 30 made of rubber or the like when the running of the front blade unit 42 is completed. The armature shaft 4c is caulked into the armature 4d. The armature guide 4e restricts the movement of the armature 4d and assists its attraction to the front electromagnet 22a. The PI light shielding unit 4h detects the position of the front drive lever 4 or the front blade unit 42 by switching the brightness and darkness of an unillustrated PI (photo-interrupter) fixed to the upper base plate 21. The roller 4i is rotatably attached to the roller shaft 4b, and charges the front drive spring 6 when pressed by a front cam portion 13a of a cam gear 13 described later. The slit washer 4j is attached so that the roller 4i does not drop from the roller shaft 4b.

The rear drive lever 5 includes a blade operating pin 5a, a roller shaft 5b, an armature shaft 5c, an armature 5d, an armature guide portion 5e, armature rubber 5f, an armature spring 5g, a PI light shielding portion 5h, a roller (cam follower) 5i, and a slit washer 5j. The blade operating pin 5a collides with the buffer member 30 when the rear blade unit 43 completes running. The armature shaft 5c is caulked into the armature 5d. The armature guide 5e restricts the movement of the armature 5d and assists its attraction to the rear electromagnet 22b. The PI light shielding unit 5h detects the position of the rear drive lever 5 or the rear blade unit 43 by switching the brightness and darkness of an unillustrated PI (photo interrupter) fixed to the upper base plate 21. The roller 5i is rotatably attached to the roller shaft 5b, and charges the rear drive spring 7 when pressed by a rear cam portion 13b of the cam gear 13 described later. The slit washer 5j is attached so that the roller 5i does not drop from the roller shaft 5b.

A pair of the front cam portion 13a and the rear cam portion 13b are formed at a point-symmetry positions with respect to the rotation center of the cam gear 13.

The front cam portion 13a has a charge area A1 for charging the front drive spring 6 to a charge completion position (cam top position) via the roller 4i. The front cam portion 13a is formed concentrically with the rotation center of the cam gear 13, and has a cam top area B1 for holding the front drive spring 6 at the charge completion position, and a cam slope area C1 for shifting moving the front drive spring 6 from the charge completion position to the reset (or setting release) position.

The front cam portion 13a has a notch portion 13d. The notch portion 13d is a space which the roller 4i enters in a live-view state described later. The notch portion 13d can secure a longer live-view phase. The notch portion 13d has a notch end 13e facing the roller 4i in transferring to the live-view state.

The rear cam portion 13b has a charge area A2 for charging the rear drive spring 7 to a charge completion position (cam top position) via the roller 5i. The rear cam portion 13b is formed concentrically with the rotation center of the cam gear 13, and has a cam top area B2 for holding the rear drive spring 7 at the charge completion position, and a cam slope area C2 for shifting the rear drive spring 7 from the charge completion position to the reset position.

The gear portion 13c is engaged with the third reduction gear 16 to cause the motor 18 to rotate in a forward rotation direction (first direction) or in a reverse rotation direction (second direction) via the second reduction gear 15, the first reduction gear 14, and the pinion gear 17.

The cam gear 13 has a phase armature 25 that detects a rotation phase of the cam gear 13 when contacting a phase pattern portion of the unillustrated flexible substrate attached to the upper base plate 21.

Referring now to FIGS. 7 to 17, a description will be given of the operation of each component in the focal plane shutter 202.

Figure 7:
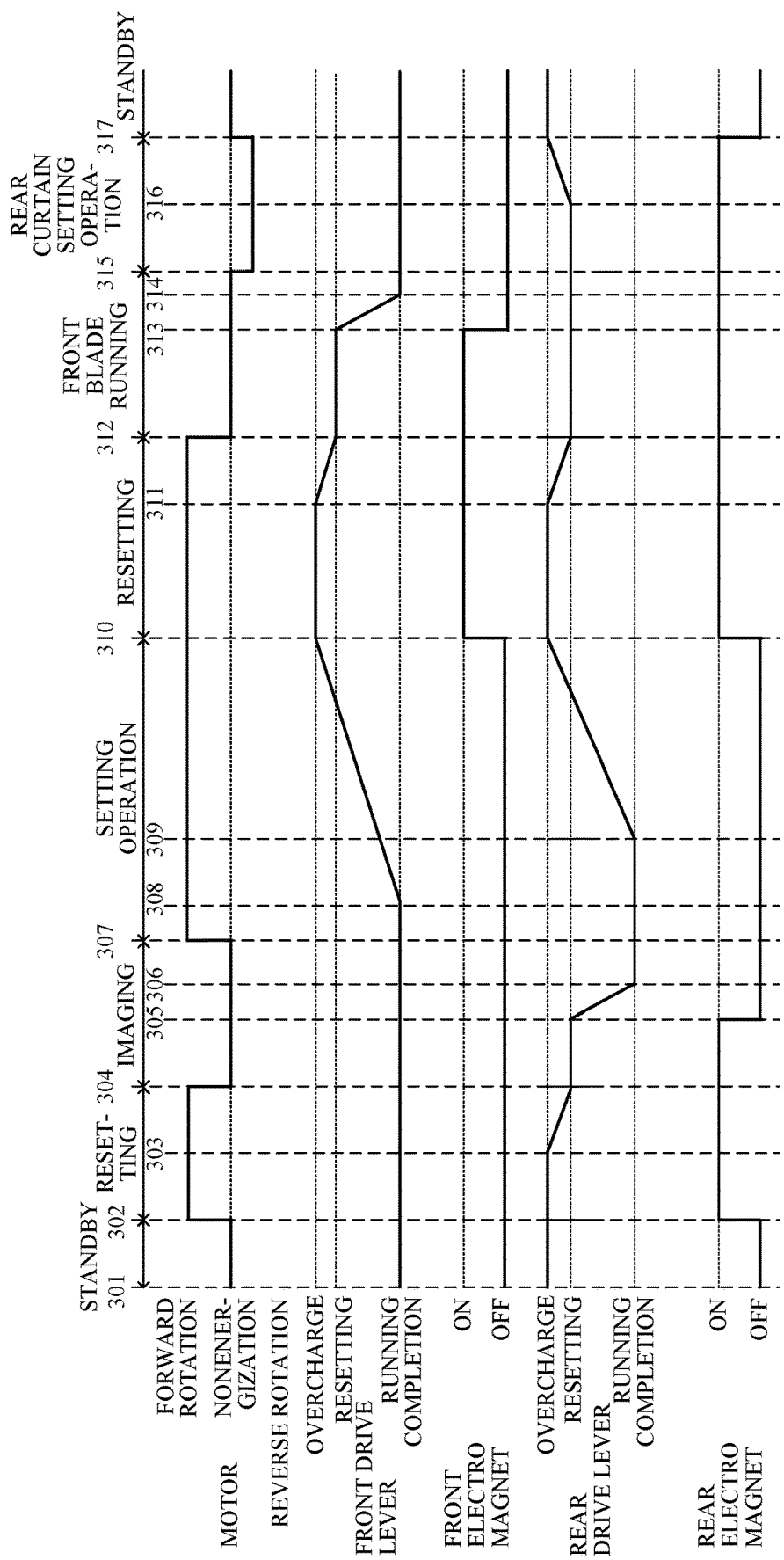
FIG. 7 is a timing chart illustrating an operation of each component of the focal plane shutter according to the first embodiment.

FIG. 7 is a timing chart showing the operation of each component during live-view imaging. FIGS. 8 to 17 illustrate the state of the focal plane shutter 202.

(1) Pre-Release Standby State

Figure 8:
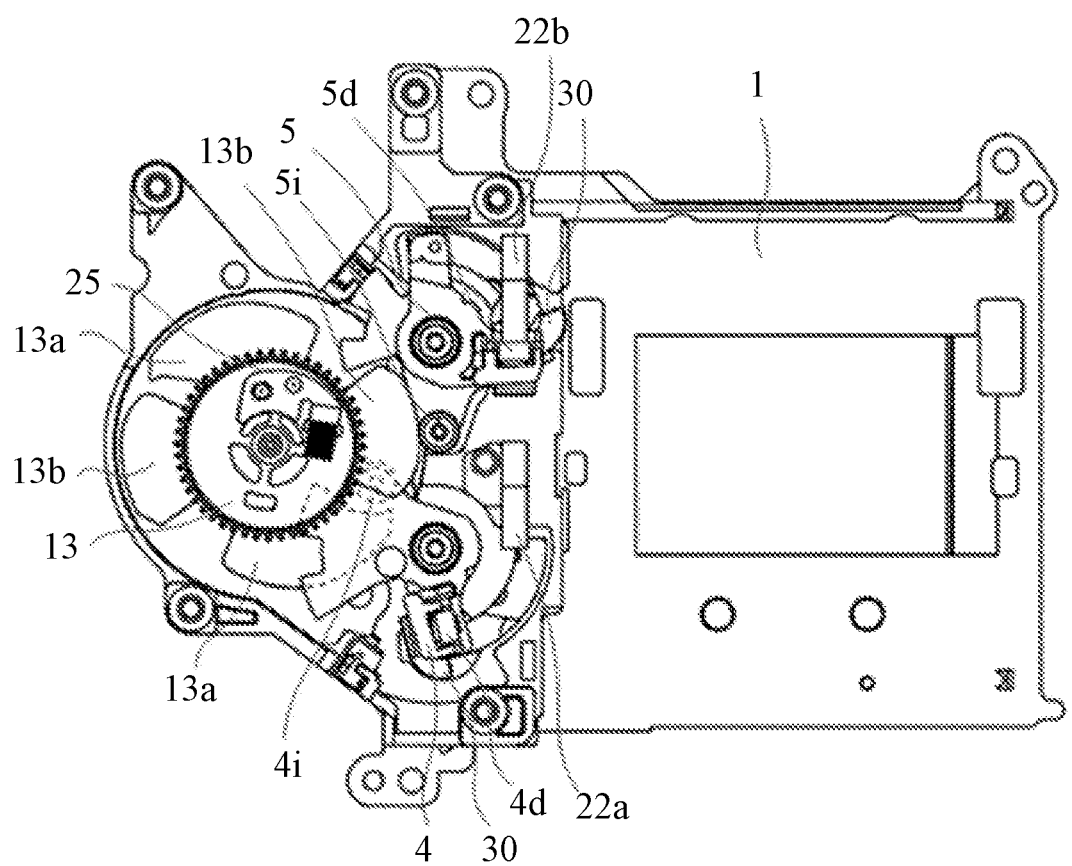
FIG. 8 illustrates a pre-release standby state of the focal plane shutter according to the first embodiment.

At timing 301, the focal plane shutter 202 is in the pre-release standby state in FIG. 8. The front blade unit 42 is in a running completion state, and the roller 4i has entered the notch portion 13d. The roller 5i contacts the cam surface of the cam top area B2, and the rear drive lever 5 is held by the cam gear 13. In other words, the shutter aperture opens, and the image pickup apparatus 200 is in a live-view state. In the state illustrated in FIG. 8, in order to secure the attraction state of the armature 5d and the rear electromagnet 22b, the rear drive lever 5 is rotated beyond the position at which the rear electromagnet 22b attracts the rear drive lever 5 and thus the state illustrated in FIG. 8 will be called an overcharge state. This play is absorbed by the gap between the armature rubber 5f and the rear drive lever 5.

(2) Resetting

During the period from timing 302 to timing 304, the setting is released. In this period, the first drive lever 4 is in the running completion state, and the motor 18 is not energized. At the timing 302, when the CPU 204 receives a release signal, the motor 18 starts being energized in the normal rotation direction and the cam gear 13 starts rotates clockwise from the state of FIG. 8. Also, the rear electromagnet 22b starts being energized. At the timing 303, the roller 5i contacts the cam surface of the cam slope area C2. The rear drive lever 5 transfers from the overcharge state to the reset state. The rear cam portion 13b reaches a position where it does not contact the roller 5i and stops. The focal plane shutter 202 enters a reset state in which the overcharge state has been released. As a result, the rear drive lever 5 can be run (or driven) by the rear drive spring 7, but since the rear electromagnet 22b is energized and the armature 5d and the rear electromagnet 22b are attracted to each other, the rear drive lever 5 rotates by a predetermined amount and stops. In other words, the gap between the armature rubber 5f and the rear drive lever 5 caused by overcharging is removed, and the rear drive lever 5 is held while the armature rubber 5f is compressed and balanced with the load of the rear drive spring 7. At the timing 304, the motor 18 stops after the phase armature 25 detects that the rear cam portion 13b has retreated from the driving locus of the rear driving lever 5 and the cam gear 13 has rotated clockwise to a phase at which the rear driving lever 5 can run. At this time, the focal plane shutter 202 is in the reset state in FIG. 9.

(3) Imaging

In the period from the timing 304 to timing 307, imaging is performed. At the timing 304, when a predetermined time elapses after the motor 18 stops, the image sensor 203 starts electronic front curtain scanning. At the timing 305, the rear electromagnet 22b is released from being energized. The exposure time of the image sensor 203 is determined by the electronic front curtain imitating the slit of the first blade 42c and the timing of releasing the energization of the rear electromagnet 22b. The rear drive lever 5 is biased by the rear drive spring 7 and starts running from the state illustrated in FIG. 9. At the timing 306, the blade operating pin 5a collides with the buffer member 30, and the rear blade unit 43 completes running. At this time, the focal plane shutter 202 is in the running completion state of the rear blade unit 43 in FIG. 10. Thereafter, a predetermined time (a period from the timing 306 to the timing 307 in this embodiment) needs to elapse after the rear blade unit 43 completes running and stabilizes vibrations of each blade.

(4) Setting Operation

Figure 11:
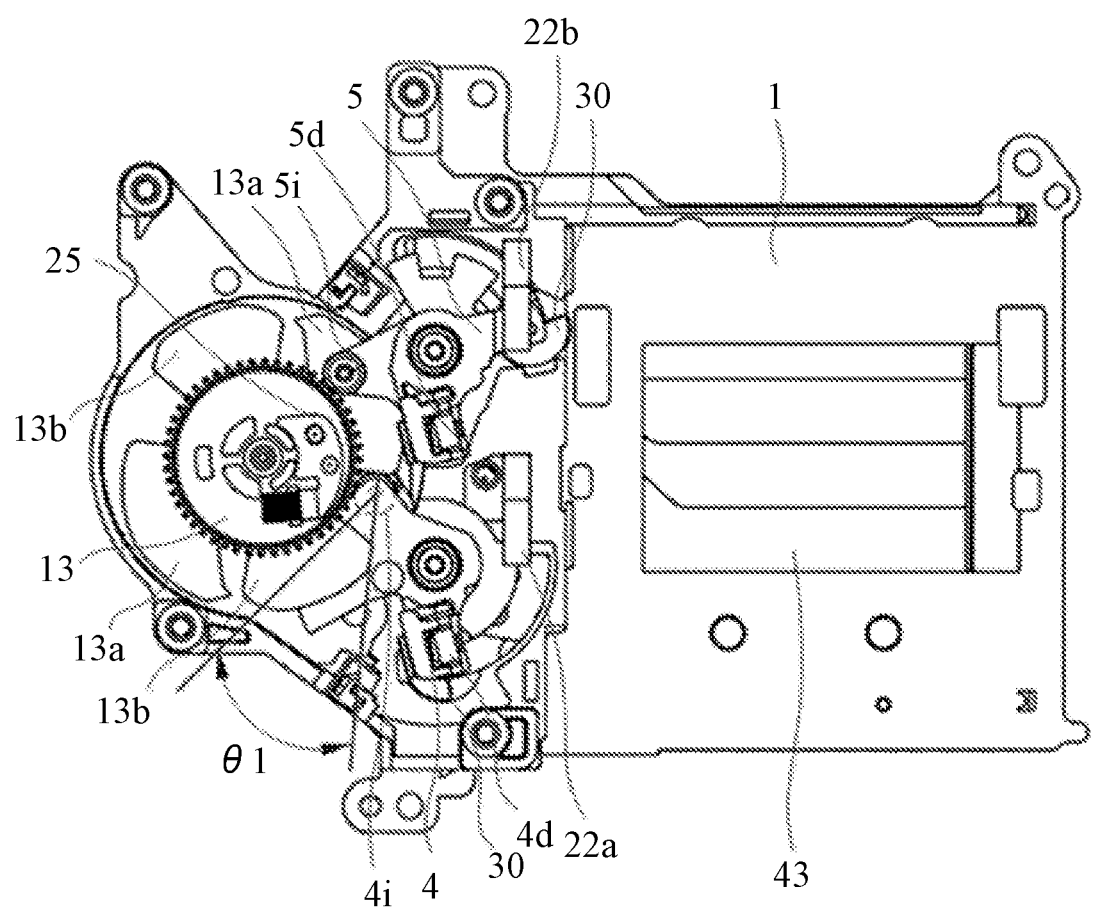
FIG. 11 illustrates a charge starting state of a front drive lever in the focal plane shutter according to the first embodiment.
Figure 12:
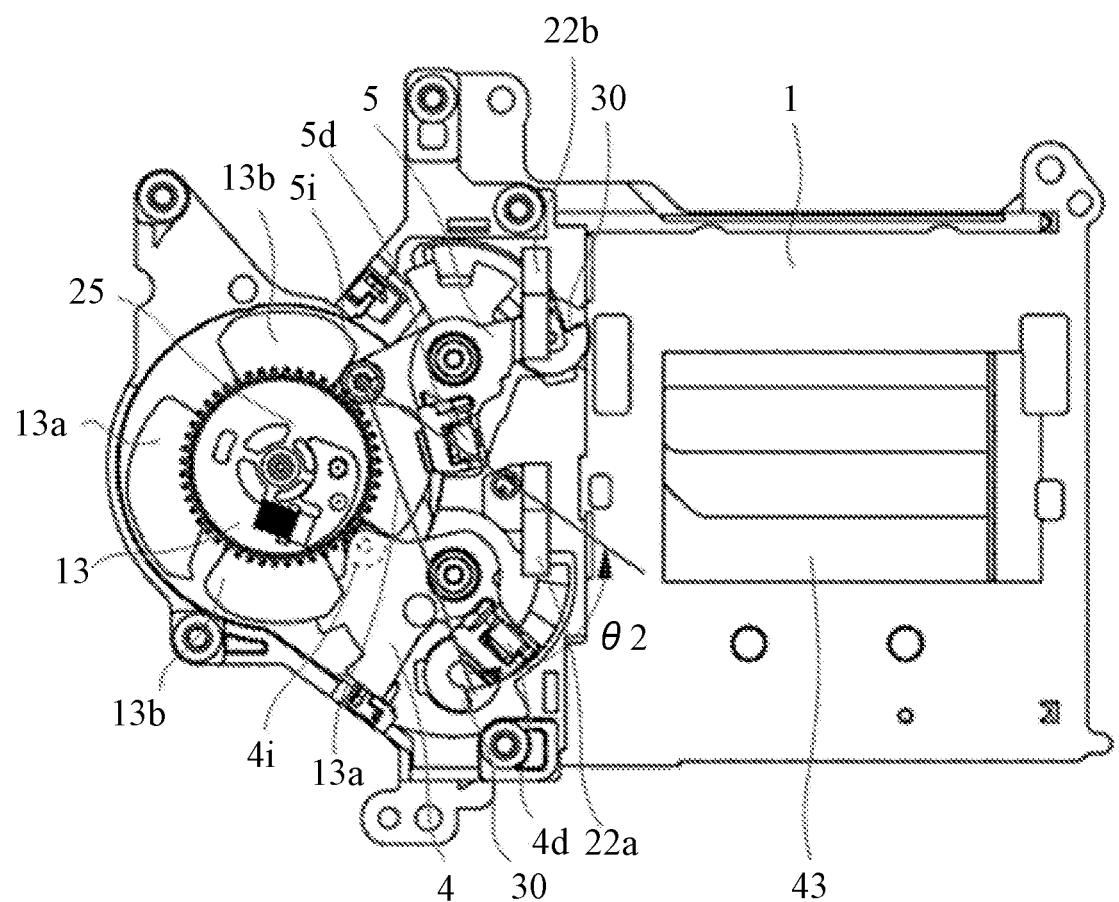
FIG. 12 illustrates a charge starting state of a rear drive lever in the focal plane shutter according to the first embodiment.

During the period from the timing 307 to timing 310, the setting operation is performed that sets the front drive lever 4 and the rear drive lever 5 from the running completion state to the overcharge state (charge completion state) against the biasing forces of the front drive spring 6 and the rear drive spring 7. At the timing 307, the motor 18 starts being energized in the forward direction, and the cam gear 13 starts clockwise turning from the state in FIG. 10. At the timing 308, the front drive lever 4 reaches the charged position. The focal plane shutter 202 is in a charge starting state of the first drive lever 4 in FIG. 11. As the cam gear 13 further rotates clockwise, the roller 4i contacts the cam surface of the charge area A1 and the front drive lever 4 starts being charged. At the timing 309, the focal plane shutter 202 enters a charge starting state of the rear drive lever 5 in FIG. 12. As illustrated in FIG. 12, the front drive lever 4 has been charged by a predetermined amount, and the rear drive lever 5 has reached the charged position. As the cam gear 13 further rotates clockwise, the roller 5i contacts the cam surface of the charge area A2 and the rear drive lever 5 starts being charged. By charging the first drive lever 4 first by a predetermined amount, the blades forming the slits overlap each other, so that the shutter aperture can be kept closed while the front and rear drive levers are charged.

The setting operation is to charge the first drive lever 4 and the rear drive lever 5 from the driving completion state to the overcharge state. During charging in the charge areas A1 and A2, a large load needs to be charged because the pressure angles $\theta 1$ and $\theta 2$ are large as illustrated in FIGS. 11 and 12. Therefore, in the setting operation, it is necessary to increase the voltage for driving the motor 18. On the other hand, by increasing the angles in the charge areas A1 and A2, the pressure angles $\theta 1$ and $\theta 2$ or the load can be reduced.

Figure 13:
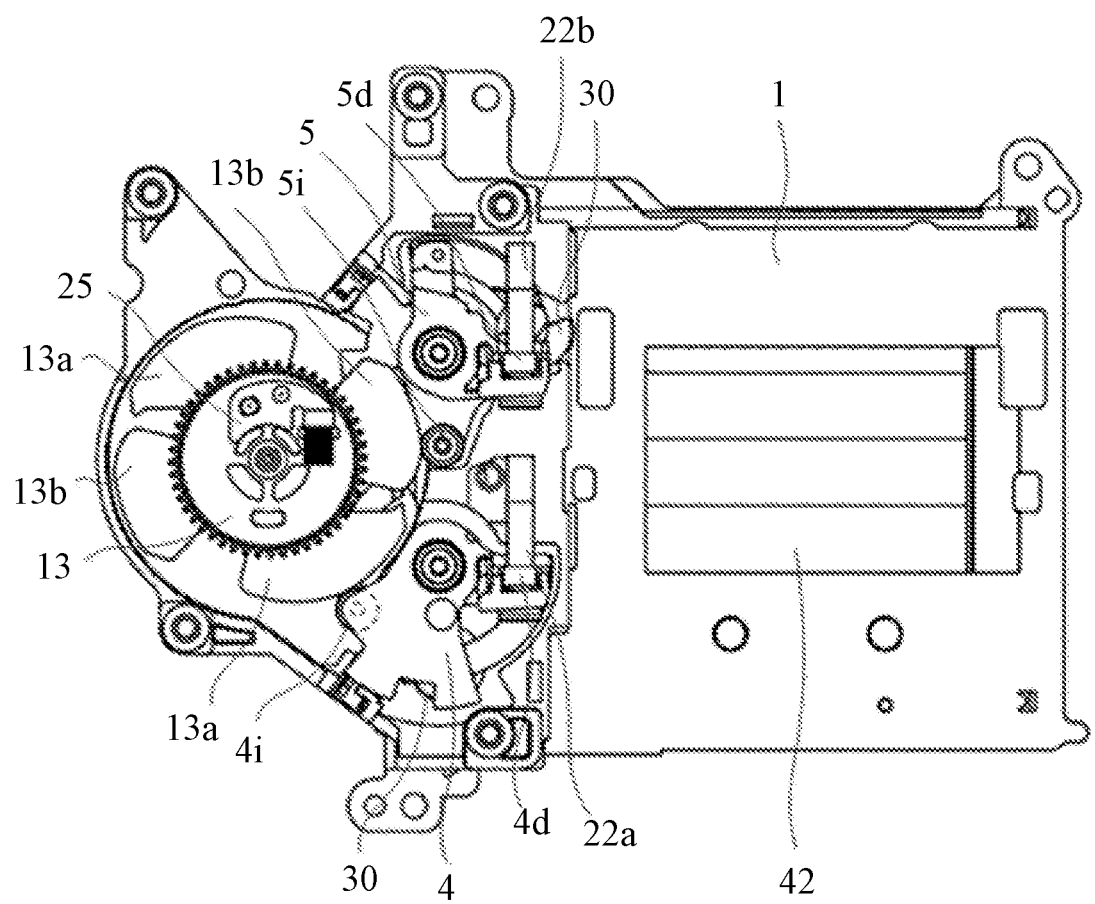
FIG. 13 illustrates an overcharge state of each blade unit in the focal plane shutter according to the first embodiment.

When the cam gear 13 further rotates clockwise from the state illustrated in FIG. 12, at timing 310, the focal plane shutter 202 enters the overcharge state of each blade unit illustrated in FIG. 13. At this time, the roller 4i has reached the cam top area B1 and the roller 5i has reached the cam top area B2. Thereby, both the front drive lever 4 and the rear drive lever 5 enter the overcharge state in which charging is completed, and the setting is completed.

(5) Resetting (4) During the period from the timing 310 to timing 312, the setting is released. At the timing 310, the motor 18 is continuously energized in the normal rotation direction. The roller 4i and the roller 5i respectively pass through the cam surfaces of the cam top areas B1 and B2. At this time, the front electromagnet 22a starts being energized, and the armature 4d and the front electromagnet 22a are attracted to each other. Also, the rear electromagnet 22b starts being energized, and the armature 5d and the rear electromagnet 22b are attracted to each other. Thus, after resetting, the front drive lever 4 and the rear drive lever 5 are held.

Figure 14:
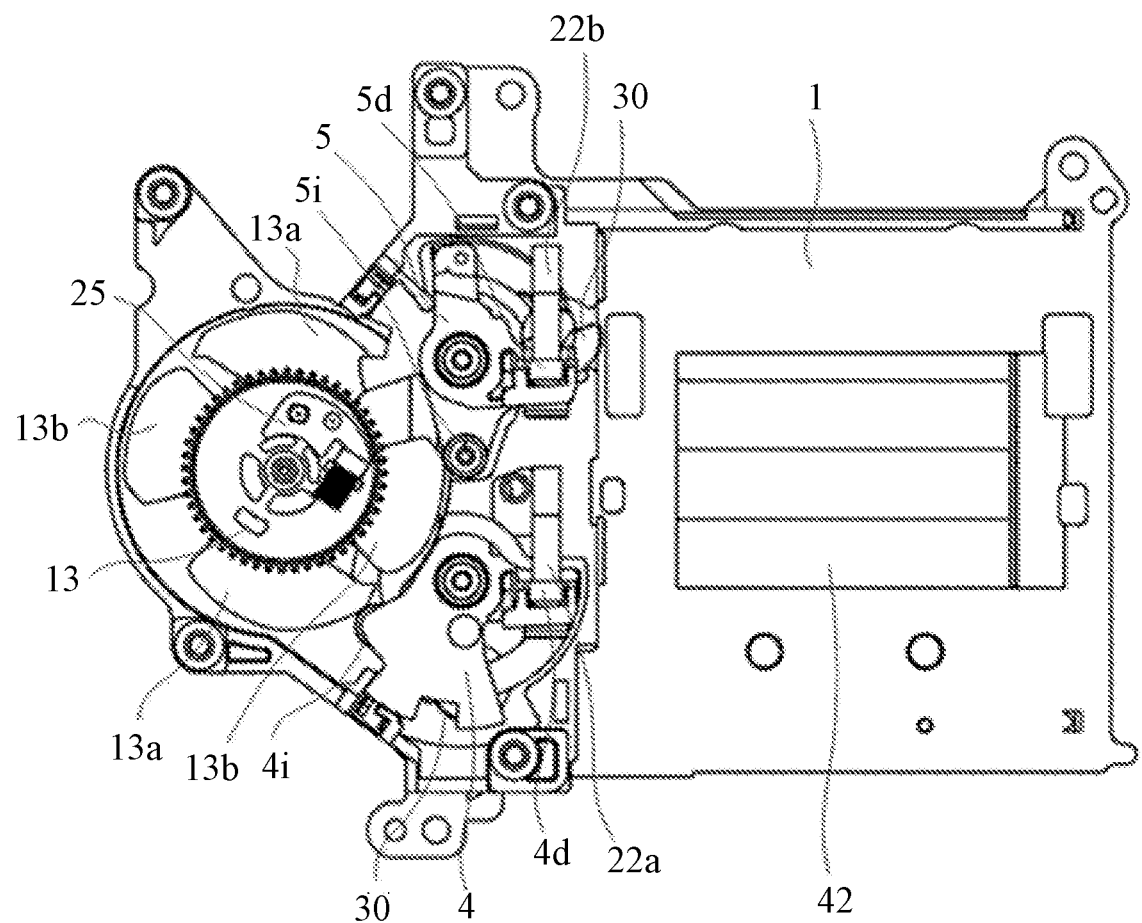
FIG. 14 illustrates a resetting starting state of each blade unit in the focal plane shutter according to the first embodiment.
Figure 15:
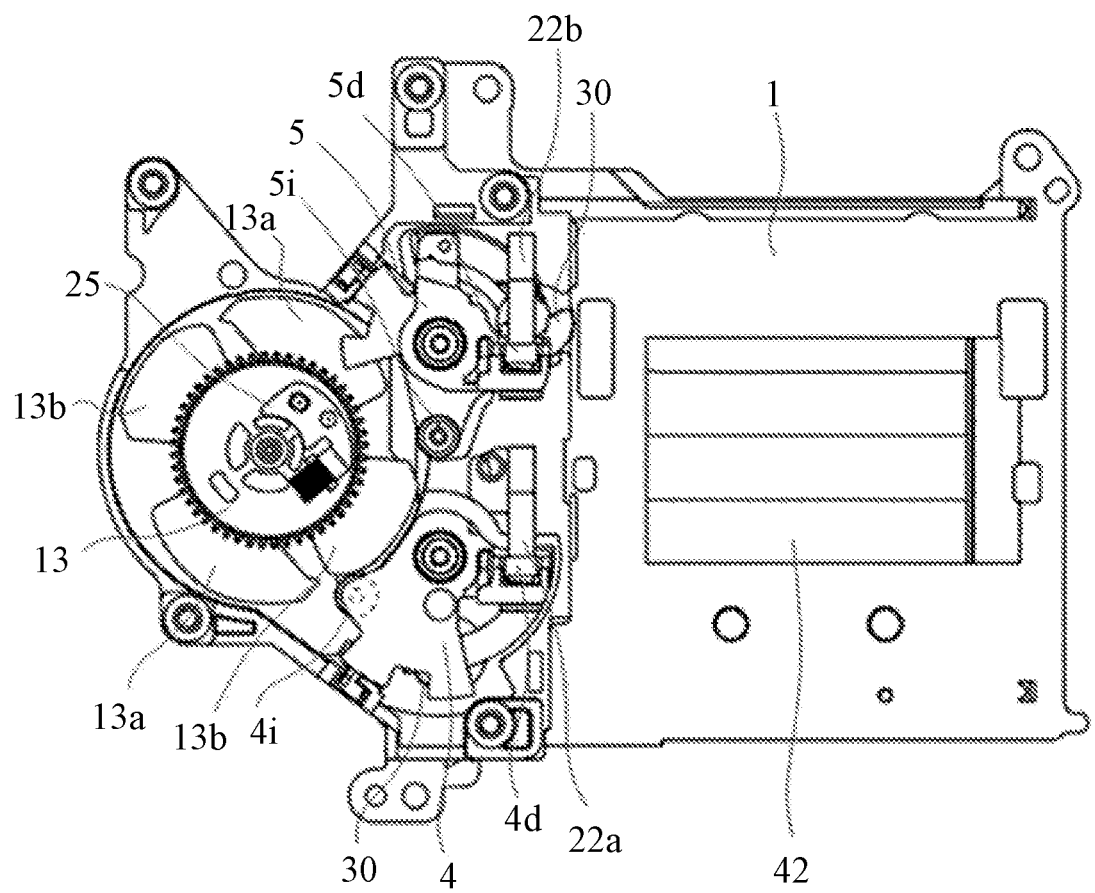
FIG. 15 illustrates a reset state of each blade unit in the focal plane shutter according to the first embodiment.

At the timing 311, the focal plane shutter 202 enters the starting state of resetting each blade unit in FIG. 14. The rollers 4i and 5i contact the cam surfaces of the cam slope areas C1 and C2, respectively. In other words, the front drive lever 4 and the rear drive lever 5 gradually transfer from the overcharge state to the reset state. The timing at which the roller 4*i* shifts from the cam surface of the cam top area B1 to the cam surface of the cam slope area C1 and the timing at which the roller 5*i* shifts from the cam surface of the cam top area B2 to the cam surface of the cam slope area C2 are simultaneous. After the phase armature 25 detects that the cam gear 13 has rotated clockwise to a phase at which the front drive lever 4 and the rear drive lever 5 can run, the motor 18 stops at the timing 312. At this time, the focal plane shutter 202 is in the reset state of each blade unit in FIG. 15.

(6) Front Blade Running

During the period from the timing 312 to timing 315, the front blades run. When a predetermined time elapses after the motor 18 is stopped, at the timing 313, the front electromagnet 22*a* is released from being energized, and the front drive lever 4 is biased by the front drive spring 6 to start running from the state of FIG. 15. At the timing 314, the blade opening pin 4*a* collides with the buffer member 30, the shutter aperture opens, and the focal plane shutter 202 enters the reset state in FIG. 9. A period from the timing 302 to the timing 314 corresponds to one sequence of the live-view imaging.

(7) Rear Curtain Setting Operation

From the timing 307 to the timing 314 after imaging (in a period from imaging to the next imaging timing), the CPU 204 detects whether the second switch 211 is turned on or off or whether or not there is an imaging instruction from the user.

Figure 9:
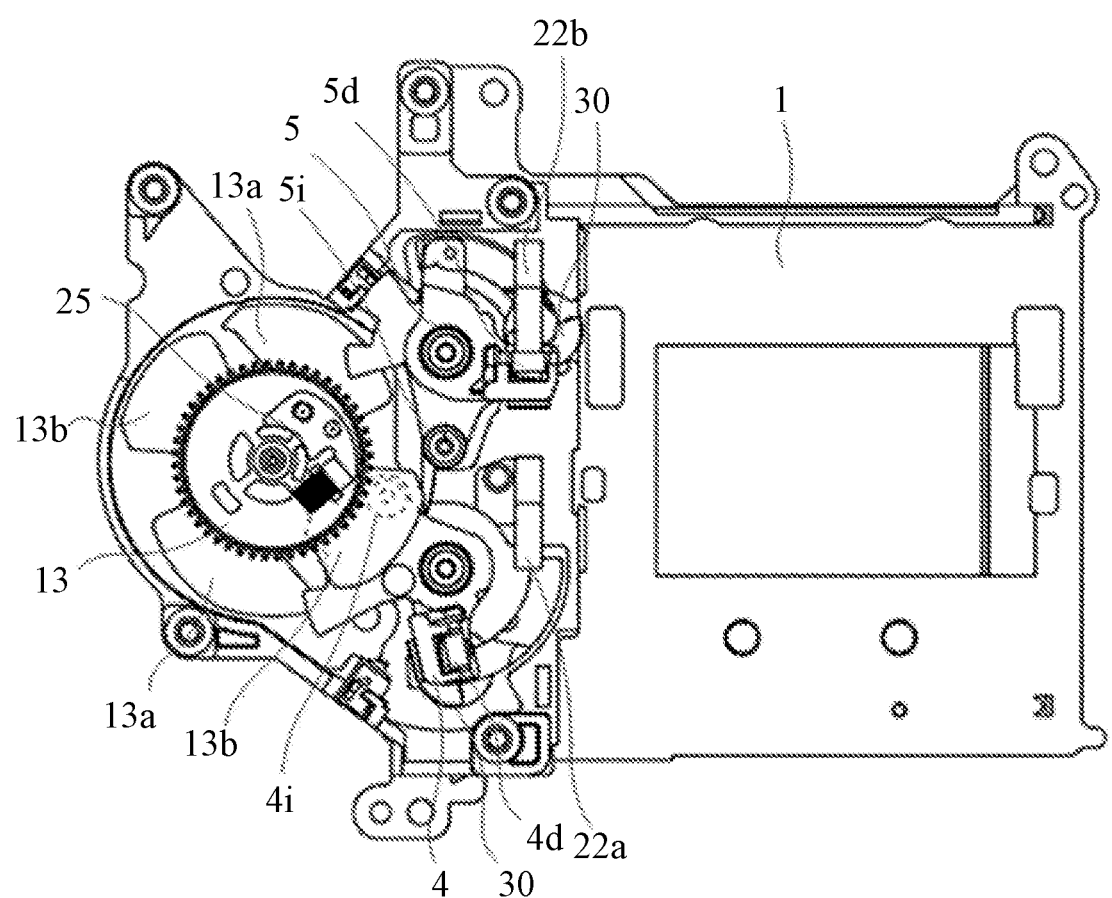
FIG. 9 illustrates a reset state of the focal plane shutter according to the first embodiment.
Figure 10:
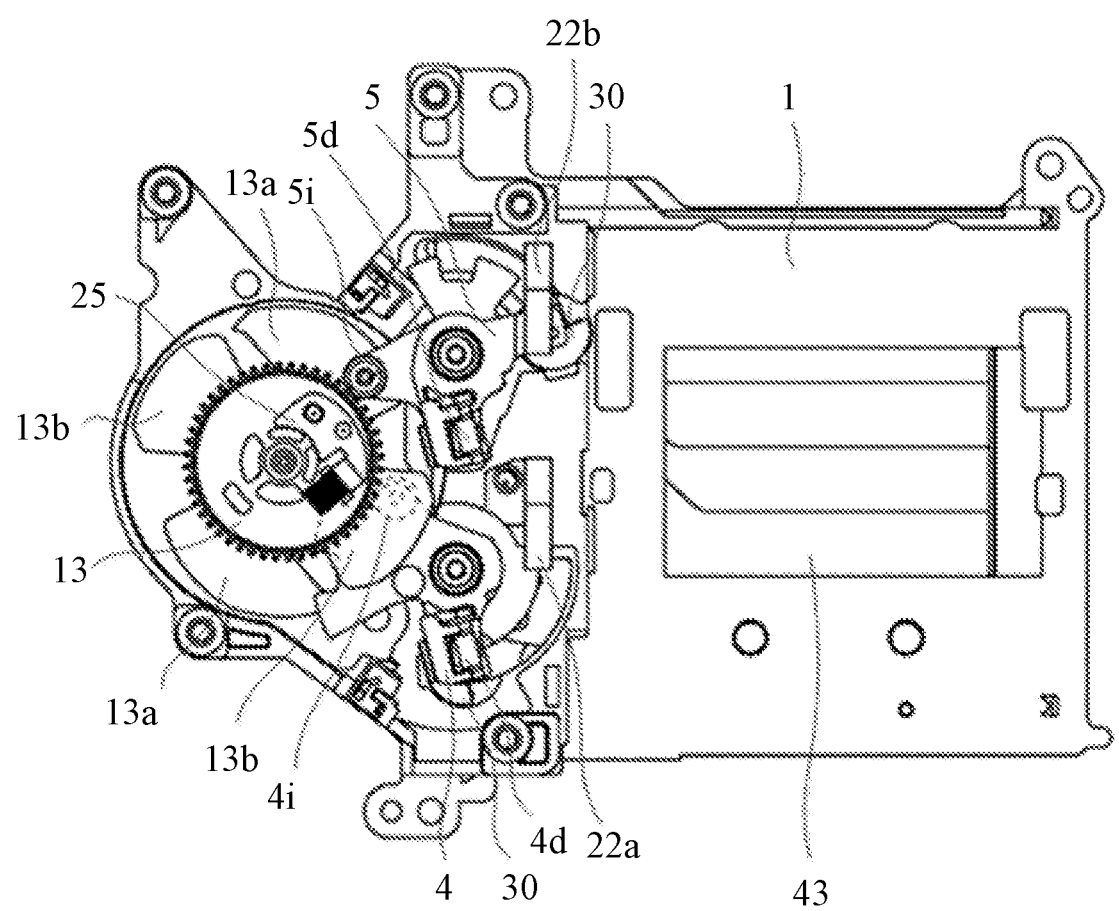
FIG. 10 illustrates a running completion state of a rear blade unit in the focal plane shutter according to the first embodiment.
Figure 16:
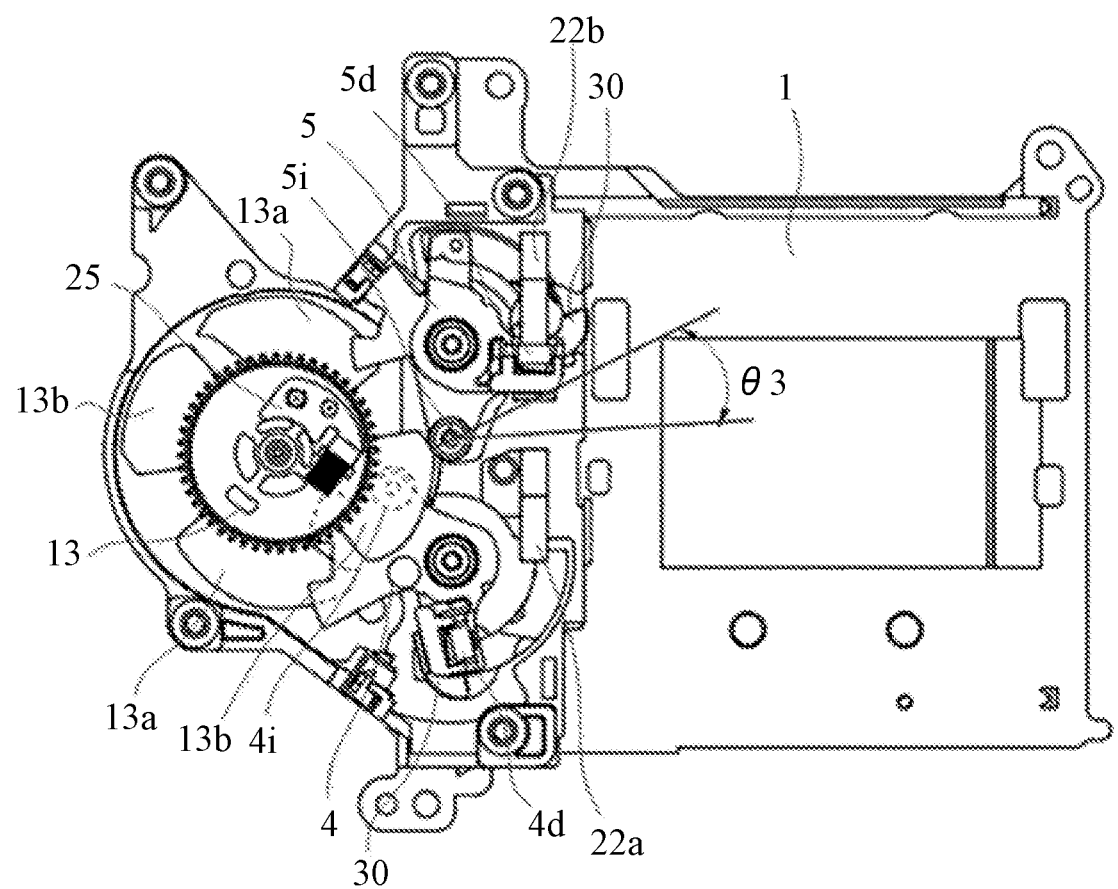
FIG. 16 illustrates a rear curtain setting operation starting state of the focal plane shutter according to the first embodiment.

When the user issues the imaging instruction, the focal plane shutter 202 returns to the state illustrated in FIG. 9 and then performs imaging. When there is no imaging instruction from the user, the rear curtain setting operation is performed during a period from timing 315 to timing 317. At the timing 315, the motor 18 starts being energized in the reverse direction, and the cam gear 13 rotates counterclockwise from the state in FIG. 9. At the timing 316, the roller 5*i* contacts the cam surface of the cam slope area C2, and the focal plane shutter 202 enters the state of starting the rear curtain setting operation in FIG. 16. The cam gear 13 further rotates counterclockwise from the state of FIG. 16, and the rear drive lever 5 transfers from the reset state to the overcharge state. At this time, since the charging is performed at a small angle from resetting of the rear drive lever 5 to the overcharge state and the pressure angle θ3 is small as illustrated in FIG. 16, it is unnecessary to charge a large load. Therefore, the voltage for driving the motor 18 may be low.

Figure 17:
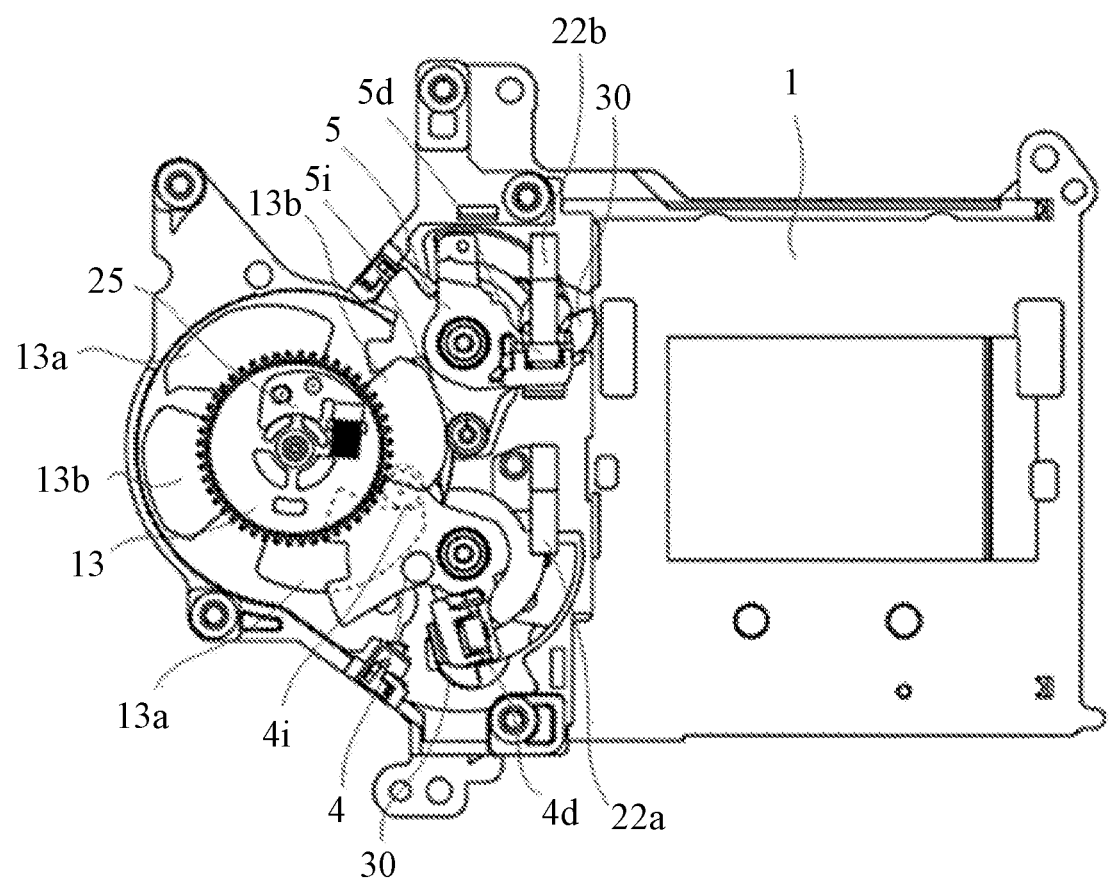
FIG. 17 illustrates a post-rear curtain setting operation state of the focal plane shutter according to the first embodiment.

At timing 317, after the phase armature 25 detects that the cam gear 13 has reached the phase of the cam top, the motor 18 stops. The rear electromagnet 22*b* is also released from being energized. At this time, the focal plane shutter 202 is in the pre-release standby state in FIG. 8. The rear drive lever 5 enters the overcharged state and is held by the cam gear 13. The roller 4*i* has entered the notch portion 13*d*. Even if the cam gear 13 overruns due to the inertia after the motor 18 stops, the rotation of the cam gear 13 is stopped since the roller 4*i* contacts the notch end 13*e* of the notch portion 13*d* as illustrated in FIG. 17. Therefore, the cam gear 13 can be reliably stopped in the live-view phase.

As described above, this embodiment does not stop the motor 18 in one sequence while the drive lever contacts the cam surface of the cam top area regardless of whether there is an imaging instruction by the user, and can shorten the one sequence period. In an attempt to stop the motor 18 while the drive lever contacts the cam surface of the cam top area after the setting operation, it is necessary to energize the motor 18 at a high voltage in the setting operation, and thus it is necessary to make larger the cam top area for the overrun after the motor 18 stops. On the contrary, as in this embodiment that energizes the motor 18 in the reverse rotation direction at a low voltage after resetting and brings the drive lever into contact with the cam surface in the cam top area, the overrun angle of the motor 18 is small and the cam top area can be shortened. In other words, in one sequence, the time can be shortened for the drive lever to pass through the cam surface of the cam top area for resetting from the setting operation.

Also, in this embodiment, each drive lever simultaneously shifts from the cam top position to the reset position. Then, after the first drive lever 4 completes running, the rear drive lever 5 is held on the cam surface in the cam top area by rotating the cam gear 13 in the direction opposite to the charging direction. In other words, the state shifts to the live-view state. In the live-view state (the state of FIG. 8), the roller 4*i* has entered the notch portion 13*d*, so that the first drive lever 4 can be prevented from interfering with the cam gear 13. With such a configuration, the cam phase in the live-view state and the cam phase in the charge completion state (the state in FIG. 13) can be made common to each other. Therefore, no live-view dedicated state is required. Since no live-view dedicated state is required, the cam phase in the charge area can be increased, the required charging load and the current consumption can be reduced. Thus, even if the gear ratio is increased, the current consumption can be maintained, and the frame rate can be increased.

As described above, the configuration of this embodiment can save power and increase the frame rate.

This embodiment has described the sequence and structure in the live-view imaging using the electronic front curtain but the present invention is not limited to this embodiment. The present invention is also applicable to the normal imaging using the front blade unit 42 and the rear blade unit 43. In this case, the operation of the front drive lever 4 is the same as the operation of the rear drive lever 5, and the front blade unit 42 may run instead of the electronic front curtain.

Second Embodiment

Figure 18:
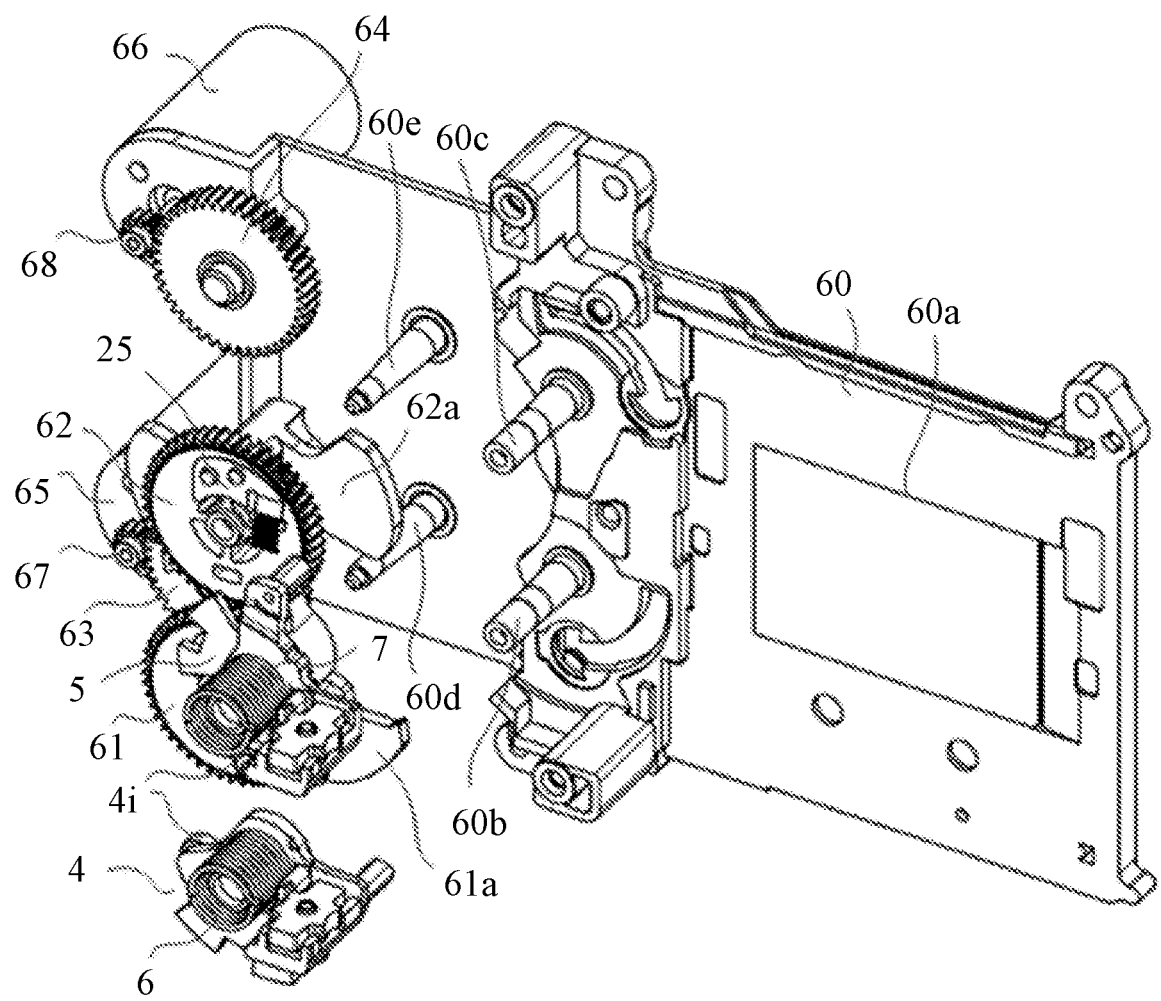
FIG. 18 is an exploded perspective view of a focal plane shutter according to a second embodiment.

FIG. 18 is an exploded perspective view of the drive lever side of the focal plane shutter 202 according to this embodiment viewed from the object side. FIG. 18 omits the same structure as that of FIG. 2 according to the first embodiment. The focal plane shutter 202 according to this embodiment differs from that of the first embodiment in that a motor and a cam gear are provided for each drive lever. A shutter base plate 60 has an aperture 60*a*, a front drive lever shaft 60*b*, a rear drive lever shaft 60*c*, a front cam gear shaft 60*d*, and a rear cam gear shaft 60*e*. The front cam gear 61 has only a cam portion 61*a* that slides with the roller 4*i* attached to the front drive lever 4. The cam portion 61*a* has the same shape as that of the front cam portion 13*a*. The rear cam gear 62 has only a cam portion 62*a* that slides with the roller 5*i* attached to the rear drive lever 5. The cam portion 62*a* has the same shape as that of the rear cam portion 13*b*. The phase armature 25 is attached to each of the front cam gear 61 and the rear cam gear 62. Each phase armature is used to detect the rotational phase of each cam gear. A front pinion gear 67 and a rear pinion gear 68 are attached to a front motor 65 and a rear motor 66, respectively. The driving force of the front motor 65 is transmitted to the front cam gear 61 via the front pinion gear 67 and the front gear 63. The driving force of the rear motor 66 is transmitted to the rear cam gear 62 via the rear pinion gear 68 and the rear gear 64.

In this embodiment, the front cam gear 61 and the rear cam gear 62 can be independently driven.

Figure 19:
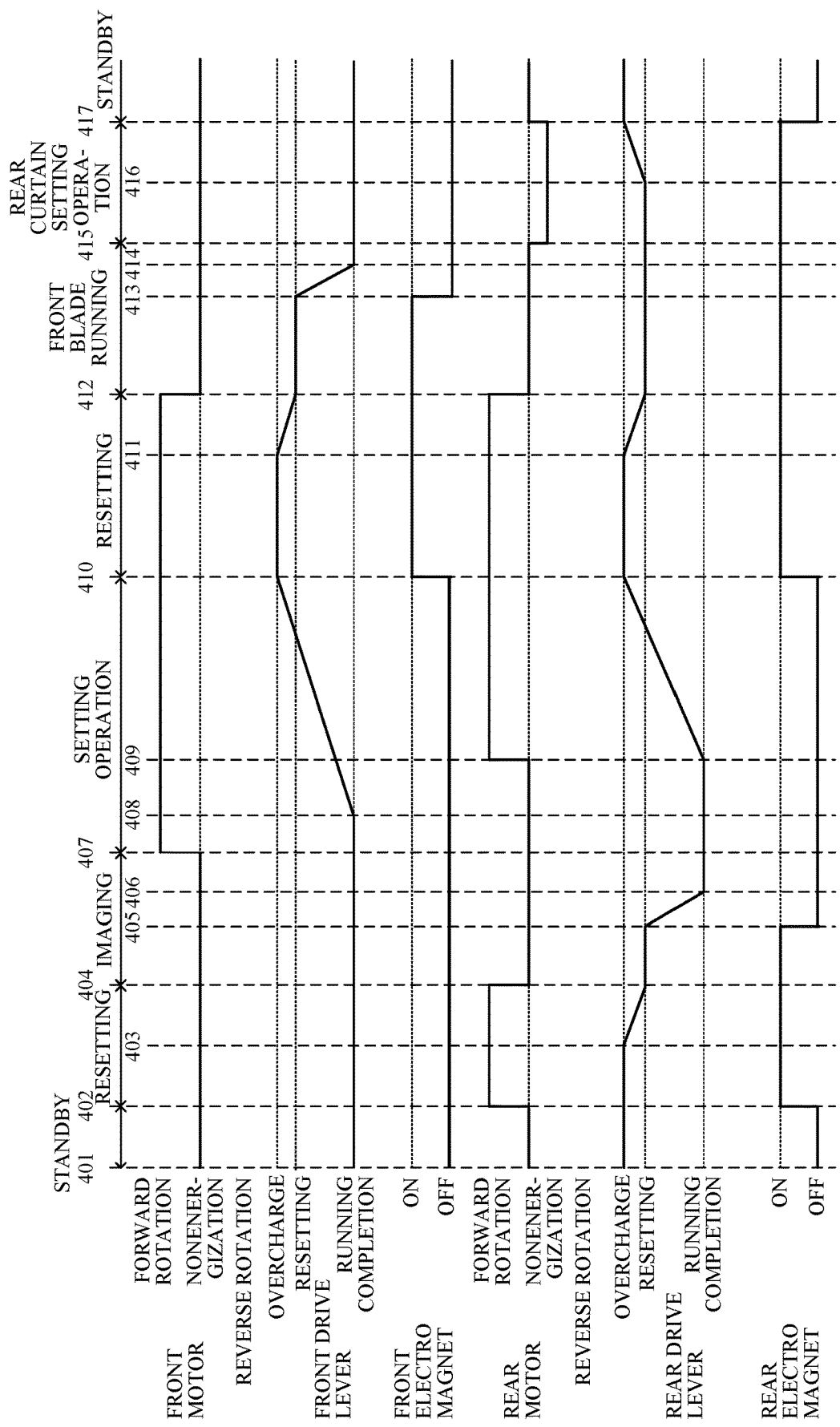
FIG. 19 is a timing chart illustrating the operation of each component in the focal plane shutter according to the second embodiment.

FIG. 19 is a timing chart showing the operation of each component during live-view capturing.

(1) Pre-Release Standby State

At timing 401, the focal plane shutter 202 is in a pre-release standby state. The front blade unit 42 is in a running completion state, and the rear drive lever 5 is in an overcharge state.

(2) Resetting

During the period from timing 402 to timing 404, the set is released. In this period, the front drive lever 4 is in the running completion state, and the power is not supplied to the front motor 65. When the CPU 204 receives the release signal at the timing 402, the rear motor 66 starts being energized in the normal rotation direction, and the rear cam gear 62 starts rotating clockwise. Also, the rear electromagnet 22b starts being energized. At the timing 403, the roller 5i contacts the cam slope area C2. The rear drive lever 5 transfers from the overcharge state to the reset state. At the timing 404, after the phase armature 25 detects that the cam portion 62a has retracted from the running locus of the drive lever 5 and the rear cam gear 62 has rotated clockwise to a phase at which the rear drive lever 5 can run, The motor 66 stops. At this time, the focal plane shutter 202 is in the reset state.

(3) Imaging

Imaging is performed in the period from the timing 404 to timing 407. This operation is the same as that of the first embodiment, and a description thereof will be omitted.

(4) Setting Operation

In a period from timing 407 to timing 410, a setting operation is performed which charges the front drive lever 4 and the rear drive lever 5 against the biasing forces of the front drive spring 6 and the rear drive spring 7, and sets the overcharge state from the running completion state. At the timing 407, the forward motor 65 starts being energized in the forward rotation direction, and the forward cam gear 61 starts rotating clockwise. At timing 408, the front driving lever 4 reaches the charged position. After the front drive lever 4 has been charged by a predetermined amount, the rear motor 66 starts being energized in the normal rotation direction, and the rear drive lever 5 reaches the charged position. The energization of the front motor 65 is started earlier than the energization of the rear motor 66, and the front drive lever 4 is charged by a predetermined amount first, so that the slit forming blades fold and the closed shutter aperture can be maintained while the front and rear drive levers are charged.

(5) Resetting

During a period from the timing 410 to timing 412, the setting is released. This operation is the same as that in the first embodiment, and a description thereof will be omitted.

(6) Front Blade Running

During a period from the timing 412 to timing 415, the front blades run. This operation is the same as that in the first embodiment, and a description thereof will be omitted.

(7) Rear Curtain Setting Operation

During a period from the timing 407 to timing 414 after imaging, the CPU 204 detects whether there is an imaging instruction from the user.

When the user issues the imaging instruction, the focal plane shutter 202 returns to the reset state and imaging follows. When there is no imaging instruction from the user, the rear curtain setting operation is performed in a period from timing 415 to timing 417. At the timing 415, the rear motor 66 starts being energized in the reverse rotation direction, and the rear cam gear 62 rotates counterclockwise. At the timing 416, the focal plane shutter 202 enters the rear curtain setting operation starting state. When the rear cam gear 62 further rotates counterclockwise, the rear drive lever 5 transfers from the reset state to the overcharge state.

At the timing 417, after the phase armature 25 detects that the rear cam gear 62 has reached the phase of the cam top, the rear motor 66 stops. The rear electromagnet 22b is released from being energized. At this time, the focal plane shutter 202 is in the pre-release standby state. The rear drive lever 5 enters the overcharged state and is held by the rear cam gear 62. On the other hand, power is not supplied to the front motor 65, and the front drive lever 4 maintains the running completion state.

As described above, this embodiment does not stop the motor 18 while the drive lever contacts the cam surface of the cam top area regardless of whether there is an imaging instruction from the user in one sequence, and one sequence time can be shortened. Thereby, the frame rate can be increased.

The load to be charged can be divided into two by providing the cam gears for charging the front drive lever 4 and the rear drive lever 5 and the corresponding motors. Thus, the output of the motor can be reduced to a low torque, so that a compact motor can be used. In other words, the focal plane shutter 202 including the motor can be made smaller. By using two motors, the motor is not energized during the period when the first drive lever 4 does not need to be operated, so that the power can be saved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2019-074590, filed on Apr. 10, 2019, and 2019-074589, filed on Apr. 10, 2019, each of which is hereby incorporated by reference herein in its entirety.

What is claimed is:

1. An image pickup apparatus configured to capture an image in accordance with a capturing instruction from a user, the image pickup apparatus comprising:
    a base plate having an aperture through which light passes;
    a first drive member configured to drive a first blade unit;
    a second drive member configured to drive a second blade unit;
    a first biasing member configured to bias the first driving member such that the first blade unit moves from a closed state that closes the aperture to an opening state that opens the aperture;
    a second biasing member configured to bias a second drive member such that the second blade unit moves from the opening state to the closed state;
    a cam member having a first phase configured to hold the second drive member while the second biasing member is charged, and a second phase configured to enable the second drive member to be driven;
    a driver configured to drive the cam member; and
    a controller configured to drive the driver in a first direction after first imaging, until the cam member passes through the first phase and reaches the second phase, and to drive the driver in a second direction opposite to the first direction when an imaging instruction is released from the first imaging to second imaging next to the first imaging, until the cam member reaches the first phase from the second phase.

2. The image pickup apparatus according to claim 1, wherein the cam member holds the first and second drive members in the first phase while charging the first and second biasing members, and enables the first and second drive members to be driven in the second phase.

3. The image pickup apparatus according to claim 1, wherein when the cam member reaches the first phase before reaching the second phase, the first and second drive members are held while the first and second bias members are charged, and wherein when the cam member changes from the second phase to the first phase, the first blade unit is in the opening state, and the second drive member is held by the cam member while the second biasing member is charged.

4. The image pickup apparatus according to claim 3, wherein the cam member has a notch portion in which the first drive member is disposed when the cam member changes from the second phase to the first phase.

5. The image pickup apparatus according to claim 3, wherein a timing at which the first drive member released from being held by the cam member while the first biasing member is charged coincides with a timing at which the second biasing member is released from being held by the cam member while the second biasing member is charged.

6. The image pickup apparatus according to claim 1, wherein the cam member includes a first cam member configured to hold the first drive member while the first biasing member is charged, and a second cam member configured to hold the second drive member while the second biasing member is charged.

7. The image pickup apparatus according to claim 6, wherein the first cam member has a first area configured to hold a cam follower of the first drive member at a cam top position, and a second cam area configured to shift the first drive member from a state held by the cam member to a drivable state, and wherein the second cam member has a third area configured to hold a cam follower of the second drive member at a cam top position, and a fourth area configured to shift the second drive member from a state held by the cam member to a drivable state.

8. The image pickup apparatus according to claim 6, comprising two first cam members and two second cam members, wherein the first cam members and the second cam members are arranged in a point symmetry with respect to a rotation center of the cam member.

9. The image pickup apparatus according to claim 6, wherein the driver includes a first driver configured to drive the first cam member, and a second driver configured to drive the second cam member.

* * * * *